United States Patent [19]

Schwirtlich et al.

[11] Patent Number: 4,837,376
[45] Date of Patent: Jun. 6, 1989

[54] PROCESS FOR REFINING SILICON AND SILICON PURIFIED THEREBY

[75] Inventors: Ingo Schwirtlich; Horst Lange, both of Krefeld; Werner Kannchen, Duisburg, all of Fed. Rep. of Germany

[73] Assignee: Bayer Aktiengesellschaft, Leverkusen, Fed. Rep. of Germany

[21] Appl. No.: 104,657

[22] Filed: Oct. 5, 1987

[30] Foreign Application Priority Data

Oct. 15, 1986 [DE] Fed. Rep. of Germany ....... 3635064

[51] Int. Cl.$^4$ .............................................. C01B 33/02
[52] U.S. Cl. .......................... 423/348; 156/DIG. 64; 423/349
[58] Field of Search ....................... 423/348, 349, 350; 156/DIG. 64

[56] References Cited

U.S. PATENT DOCUMENTS

| 3,442,622 | 5/1969 | Monnier et al. | 423/348 |
| 4,097,584 | 6/1978 | Reuschel et al. | 423/348 |
| 4,172,883 | 10/1979 | Ingle et al. | 423/348 |
| 4,200,621 | 4/1980 | Liaw et al. | 423/348 |
| 4,298,423 | 11/1981 | Lindmayer | 423/348 |

FOREIGN PATENT DOCUMENTS

| 0007063 | 1/1980 | European Pat. Off. | 423/348 |
| 1039752 | 9/1958 | Fed. Rep. of Germany | 423/348 |
| 792166 | 3/1958 | United Kingdom | 423/348 |
| 1103329 | 2/1968 | United Kingdom | 423/348 |

Primary Examiner—John Doll
Assistant Examiner—Lori S. Freeman
Attorney, Agent, or Firm—Connolly and Hutz

[57] ABSTRACT

Highly pure silicon is produced by refining impure silicon to remove deleterious impurities by contacting a melt of the impure silicon with a reacitve gas which comprises a gaseous halogen compound mixed with steam, hydrogen or a stem/hydrogen mixture.

6 Claims, No Drawings

PROCESS FOR REFINING SILICON AND SILICON PURIFIED THEREBY

The present invention relates to a process for refining silicon by treating a silicon melt with reactive gases and to silicon purfied in this way.

BACKGROUND OF THE INVENTION

Large quantities of inexpensive silicon are required for use in the photovoltaic field. Apart from economic viability, the suitability of the material is conditional, most importantly, on its compliance with purity requirements. Although the permitted residual contamination concentrations in solar silicon can lie clearly above those required of silicon in the semi-conductor industry, it is not possible at present to refine contaminated silicon to the required degree of purity in a single stage. This is due to the variety of contaminating elements and the concentrations thereof. Metallic impuritis, in particular alumium and iron are predominant. However, boron and phosphorus have a particular undesirable effect due to their doping character. In addition, removal of oxygen and carbon also poses a particular problem.

Metallic impurities can be removed by treatment of the silicon with acids, but it is not possible to reduce the residual concentrations to the desired low values below 0.1 ppmg by this method.

As described in U.S. Pat. No. 2,402,839, a purification effect can also be achieved by vacuum treatment of the melt. However, this is not suitable for removing relatively non-volatile impurities such as boron and carbon.

In German Pat. No. 3,504,723, on the other hand, the carbon and oxygen content is reduced in molten silicon which has been obtained from a charge comprising silicon compounds and carbon in an electric arc furnance by hydrogen gasification.

However, this process is not capable of removing residual metal, boron or phosphorus contents.

It is therefore an object of the present invention to provide a process according to which impure silicon can be brought to a stage of purity which complies with the requirements in the photovoltaic field from an economic point of view.

BRIEF DESCRIPTION OF THE INVENTION

It has surprisingly now been found that this object can be achieved by a simple treatment of molten silicon to be purified with reactive halogen compounds combined with steam and hydrogen.

The present invention accordingly relates to a process for refining silicon by treating a silicon melt with reactive gases, which is characterised in that the melt is simultaneously brought into contact with gaseous halogen compounds, with steam and/or hydrogen.

DETAILED DESCRIPTION

In a preferred embodiment of the process according to the invention, the halogen compound are one or more halogen silanes corresponding to the general formula $Si_nX_{2n+2}$, wherein n is 1 to 4 and X represents halogen and/or hydrogen. Economically speaking, the embodiment in which the halogen compound is silicon tetrachloride is particularly preferred. Longer chain halogen silanes as well as compounds corresponding to the formula $Si_nX_{2n+2}$ can be formed as reaction by-products while carrying out the process according to the invention.

These by-products can be removed from the melt along with unreacted halogen compound and this gas mixture, supplemented with additional halogen compound, can be recycled by blowing such mixture of halogen gases into additional silicon melt. Thus, the process can be ecomonized by recycling the unconsumed gas mixture to the further purification treatment. They therefore form a certain proportion of the reactive gas mixture.

However, the process according to the invention can also be carried out successfully if the halogen compound is hydrogen chloride. Of course, other reactive halogen compounds such as hydrogen iodide and hydrogen bromide can be used in this process.

It has proven advantageous when carrying out the process according to the invention to add inert gas to dilute the reactive gases when using halogen silanes and when using hydrogen chloride. Inert gases in the context of this invention include those which do not enter into a reaction under the reaction conditions. Argon and helium are mentioned by way of example, but other noble gases are also suitable.

The gas mixture according to the invention can be blown into the melt using an inlet tube. However, it is also possible to fill the reaction chamber above the surface of melt with this gas mixture and thus to carry out the refining treatment on the surface of the melt. The introduction of new impurities through the gasification lance or inlet tube is avoided by this mode of operation. A further possibility involves introducing the gases through a porous crucible base.

It is important with a process for purifying molten silicon to prevent impurities from being leached out of the crucible material. Materials which have proved suitable in this respect include high-density siliconresistant grades of graphite as well as non-oxidic highpurity ceramic materials such as silicon carbide or silicon nitride.

A certain proportion of the reaction gas dissolves in the melt during the refining process described above. It is therefore advisable to degas the melt by subsquent evacuation of the vessel.

This is preferably effected by subsequently degassing the silicon melt by means of a vacuum treatment at pressures of $10^{-1}$ mbar, or less.

The present invention also relates to purified silicon which has been produced by the process according to the invention. It is distinguished by a sufficiently low concentration of undesirable elements. If a low chlorine content can be detected at the same time, this provides evidence that the silicon has been produced by the process according to the invention.

The invention is illustrated, but not restricted, by the following Examples.

EXAMPLE 1

About 1 kg of silicon powder is melted in a quartz vessel by induction using a graphite susceptor under an inert gas atmosphere. The temperature of the melt was then raised to 1450° C. and a lance was introduced into the crucible from above, the lance being traversed by a gas mixture of 20 1/h of argon and 60 1/h of hydrogen as wello as 0.5 1/h of hydrogen chloride and 0.7 1/h of steam. After a treatment time of 5½ hours, the lance was removed and the pot cooled by lowering it out of the heating zone so that the silicon melt set directionally according to the Bridgman process. A sample was taken from the silicon block, broken and subjected to an acid treatment to purify its surface.

The following table gives the respective analytical values before and after treatment:

| (ppmg) | Al | B | Ba | C | Ca | Cr |
|---|---|---|---|---|---|---|
| Before | 110 | 34 | <1 | 120 | 10 | <1 |
| After | 6 | 6.5 | <1 | 10 | 4 | <1 |
| | Cu | Fe | Mg | P | Ti | Cl |
| Before | <1 | 30 | 1.7 | 23 | <1 | 0 |
| After | <1 | <1 | <1 | 20 | <1 | <1 |

As seen from the analyses, the content of aluminium, boron, carbon, calcium, iron and magnesium was significantly reduced by the treatment.

EXAMPLE 2

As in Example 1, about 1 kg of silicon powder was also melted by induction under inert gas in this experiment. A gas mixture of 60 l/h of hydrogen, 30 l/h of silicon tetrachloride, 20 l/h of argon and 0.6 l/h of steam was blown in at about 1450° C. using a lance. Similarly, the treatment was ended after 5½ hours and the melt evacuated to about $10^{-4}$ mbar. It was then crystallised by directional solidification. The analytical values before and after treatment are listed in the table. For this purpose, the sample was broken and its surface was purified by an acid treatment. The following table gives the analytical values before and after this treatment:

| (ppmg) | Al | B | Ba | C | Ca | Cr |
|---|---|---|---|---|---|---|
| Before | 110 | 13 | <1 | 120 | 10 | <1 |
| After | 2 | 1.8 | <1 | 23 | 3 | <1 |
| | Cu | Fe | Mg | P | Ti | Cl |
| Before | <1 | 30 | 1.7 | 30 | 23 | 0 |
| After | <1 | 1 | <1 | 5 | <1 | <1 |

EXAMPLE 3

As in Examples 1 and 2, the sample was gasified with a mixture of 20 l/h of hydrogen, 200 l/h of steam and 2 l/h of argon as well as 0.5 l/h of silicon tetrachloride over 5½ hours. The following analyses were produced:

| (ppmg) | Al | B | Ba | C | Ca | Cr |
|---|---|---|---|---|---|---|
| Before | 110 | 13 | <1 | 120 | 10 | <1 |
| After | 22 | 6 | <1 | 27 | 5 | <1 |
| | Cu | Fe | Mg | P | Ti | Cl |
| Before | <1 | 30 | 1.7 | 30 | 23 | 0 |
| After | <1 | 2 | <1 | 24 | <1 | <1 |

The boron, carbon, aluminium and iron concentrations could also be reduced by the treatment.

EXAMPLE 4

As in Example 1 to 3, a gas mixture of 90 l/h of hydrogen chloride, 60 l/h of hydrogen, 4 l/h of steam and 0.5 l/h of argon was blown into the melt over 5½ hours. After sampling, comminution and surface cleaning, the following cleaning effect was produced:

| (ppmg) | Al | B | Ba | C | Ca | Cr |
|---|---|---|---|---|---|---|
| Before | 1500 | 0.6 | 0.1 | 103 | 3 | 0.7 |
| After | 2.5 | 0.6 | 0.1 | 73 | 1 | <0.1 |
| | Cu | Fe | Mg | P | Ti | Cl |
| Before | 33 | 31 | 0.5 | 0.3 | 9 | 0 |
| After | 0.5 | 0.4 | 0.5 | 0.3 | 0.1 | <1 |

A particularly marked reduction in the metallic elements was consequently achieved with this mixing ratio.

What is claimed is:

1. A process for refining silicon to remove impurities which comprises contacting a silicon melt with a reactive gas which comprises a gaseous halogen compound mixed with steam, hydrogen, or a steam/hydrogen mixture wherein the halogen compound is at least one halogen silane of the formula $Si_nX_{2n+2}$, wherein n is 1 to 4 and X represents halogen and/or hydrogen.

2. A process according to claim 1 wherein the halogen compound is silicon tetrachloride.

3. A process according to claim 1 wherein the reactive gas is a mixture of silicon tetrachloride, steam and hydrogen.

4. A process according to claim 1 wherein an inert gas is added to the reactive gas.

5. A process according to claim 4 wherein the inert gas is argon.

6. A process according to claim 1 wherein the silicon melt is subsequently degasses by a vacuum treatment at pressures of $10^{-1}$ mbar or less.

* * * * *